UNITED STATES PATENT OFFICE.

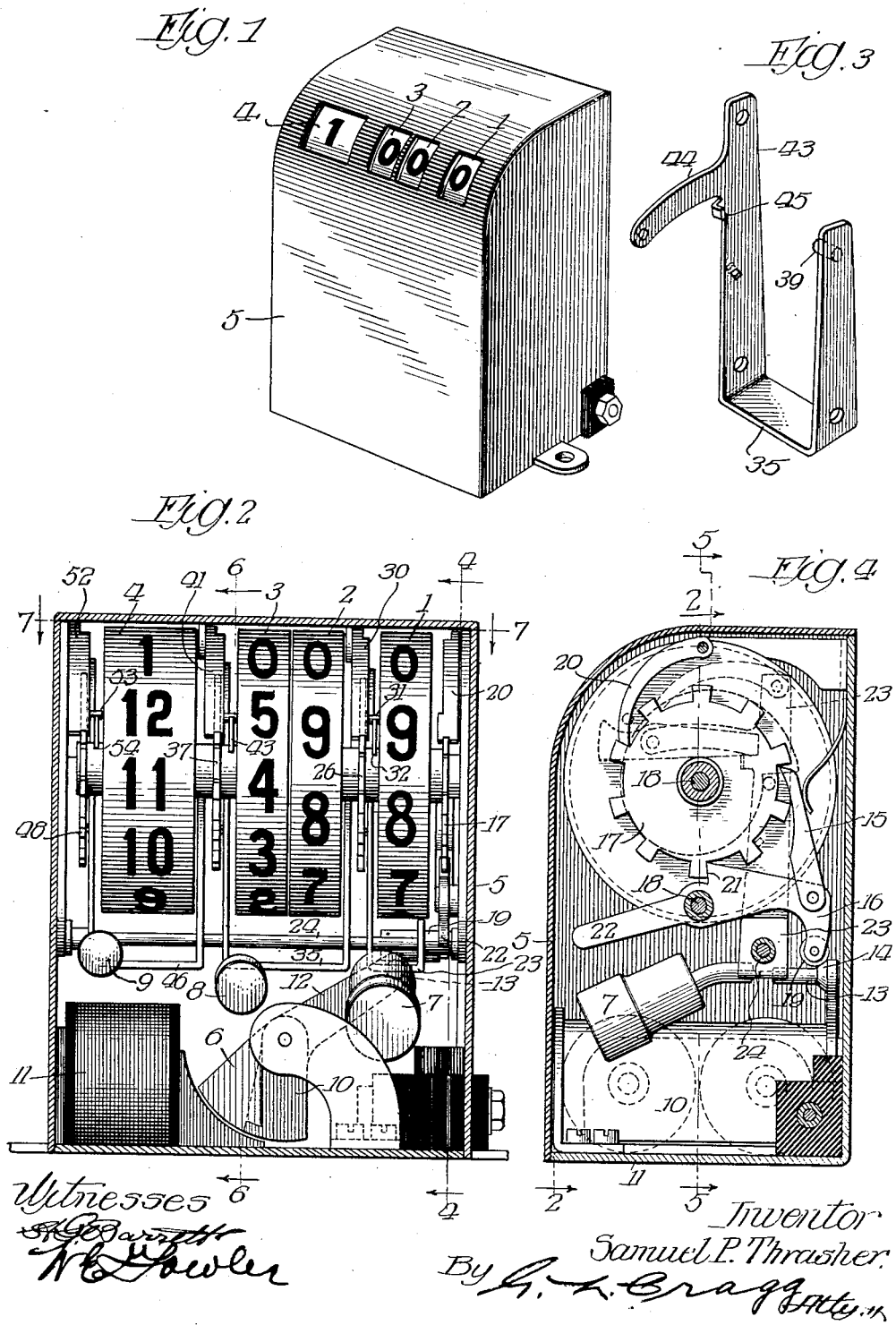

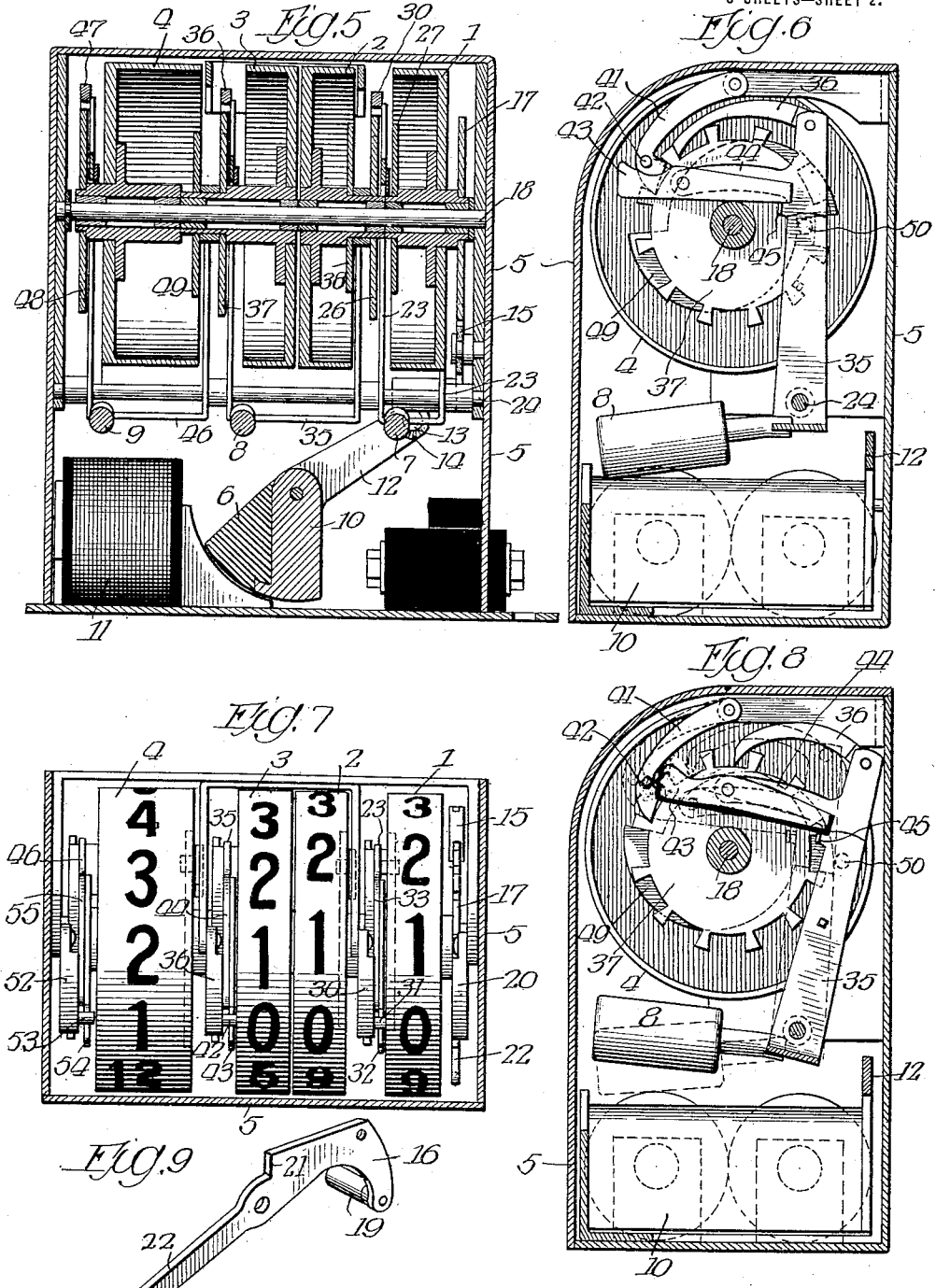

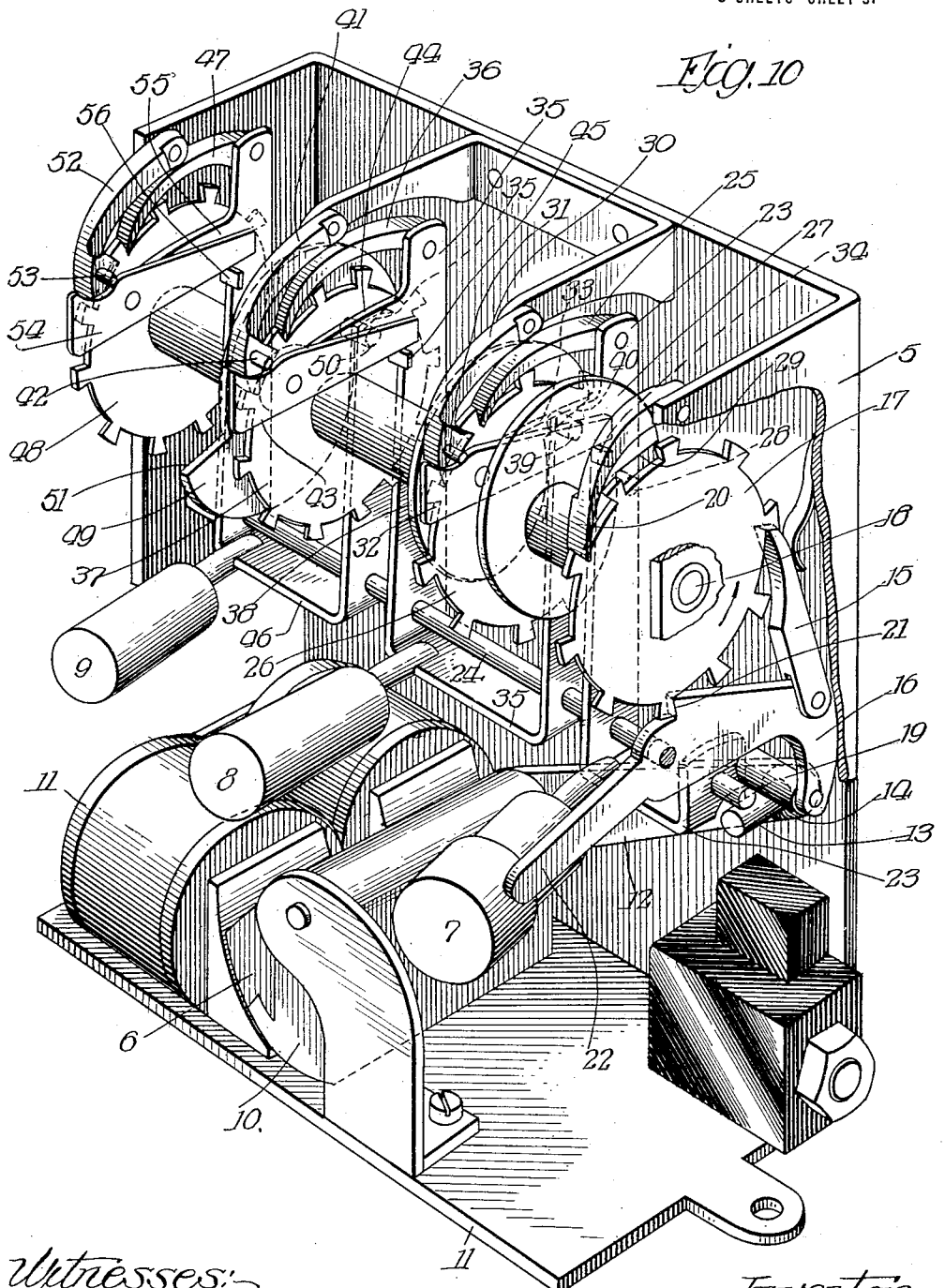

SAMUEL P. THRASHER, OF CHICAGO, ILLINOIS.

MOTION-TRANSMITTING MECHANISM.

1,158,588.  Specification of Letters Patent.  Patented Nov. 2, 1915.

Application filed December 14, 1914. Serial No. 877,031.

*To all whom it may concern:*

Be it known that I, SAMUEL P. THRASHER, citizen of the United States, residing at Chicago, in the county of Cook and State of Illinois, have invented a certain new and useful Improvement in Motion-Transmitting Mechanism, of which the following is a full, clear, concise, and exact description, reference being had to the accompanying drawings, forming a part of this specification.

My invention relates to motion transmitting mechanism and finds a useful embodiment in imparting motion to serially related time indicating character wheels, though the invention is not to be limited to this service. These wheels, as I have applied the invention, constitute the load which is to be operated by the mechanism and to the wheel parts of which load motion is to be communicated at predetermined intervals. These character wheels are, in the preferred form of the invention, fixedly coupled with toothed wheels that are individual thereto and all of which wheels are desirably free to turn upon a common shaft. Each pair of coupled wheels is associated with a self-acting device which, when free to operate, will actuate such pair of wheels through a predetermined distance or to a predetermined extent. The first pair of wheels, in the order of the succession of the various pairs of wheels, is timed in its operation by a master timing device and each succeeding pair of wheels is timed in its operation by the next preceding pair of wheels which, after having been actuated a number of steps or through a given range, serves to release the self-acting mechanism of the next succeeding pair of wheels to permit this self-acting mechanism to operate such succeeding pair of wheels.

In the preferred embodiment of the invention each preceding pair of wheels and the self-acting mechanism individual thereto are effective in storing power that is used in operating the next succeeding pair of wheels when its self-acting mechanism is liberated.

I will explain my invention more fully by reference to the accompanying drawings showing the preferred embodiment thereof as adapted to the purpose of indicating the passage of time and in which drawings Figure 1 is a perspective view showing the external appearance of such embodiment of the invention; Fig. 2 is a sectional view on line 2 2 of Fig. 4; Fig. 3 is a perspective view of an operating lever; Fig. 4 is a sectional view on line 4 4 of Fig. 2; Fig. 5 is a sectional view on line 5 5 of Fig. 4; Fig. 6 is a sectional view on line 6 6 of Fig. 4; Fig. 7 is a sectional view on line 7 7 of Fig. 4; Fig. 8 is a sectional view showing alternative positions of some of the parts as they appear in Fig. 6; Fig. 9 is a perspective view of an operating part; and Fig. 10 is a perspective view of some of the operating parts of the mechanism, other parts being omitted for the sake of clearness, this figure being also somewhat diagrammatic to reveal more clearly the method of operation.

Like parts are indicated by similar characters of reference throughout the different figures.

The character wheels 1, 2, 3, and 4 constitute elements of one form which are to be actuated or controlled by the motion transmitting mechanism of my invention, it being understood that this mechanism is not to be limited to any specific form of work that it is to accomplish. The character wheels are illustrated as being included in a time measuring device in which the character wheel 1 serves to measure the passage of tenths of a minute, that is periods of six seconds each; the character wheel 2 the passage of individual minutes; the character wheel 3 the passage of ten minute periods; and the character wheel 4 the passage of individual hours. Arabic numerals or digits are circumferentially distributed upon the peripheries of these wheels and are successively presented to view through display openings individual to the wheels in the inclosing casing 5 of the instrument as illustrated in Fig. 1. The wheel 1 has its periphery equally spaced off into ten time measuring sections that are marked 1, 2, 3, 4, 5, 6, 7, 8 9 and 0 and serve, when presented to view before the display opening individual to the wheel 1, to indicate which tenth of a minute has passed. When the 0 on the wheel 1 appears before its display opening the passage of a complete minute is indicated.

The character wheel 2 is marked similarly to the character wheel 1 but the meanings of the digits upon its periphery are different from those of the digits on the periphery of the wheel 1, each digit upon the wheel 2 measuring the number of minutes that have passed. For example, figure 8 appearing before the display opening individual to the wheel 2, indicates that eight minutes have passed. When the 0 upon the wheel 2 appears before its display opening the indication is that ten minutes have passed. The wheel 2 should, therefore, remain idle during nine of the minute fraction measuring step by step movements of the wheel 1 but when the wheel 1 has moved the tenth step to complete its revolution and present its 0 before its display opening the wheel 2 should move one step or one-tenth of its revolution to indicate the complete revolution of the wheel 1 and the passage of one minute of time.

The character wheel 3, which measures the passage of ten minute periods, indicates the passage of an hour when it has been turned a half revolution to present a 0 before its display openings, on which account its periphery is subdivided into two equal main divisions or semicircles, each main division being subdivided into six sections, the sections of each main division being marked 1, 2, 3, 4, 5, 0. In the movement of the wheel 3 through either of its hour measuring semi-revolutions it presents the digits appearing upon its periphery before the display opening individual to the wheel 3 so that one may know how many ten minute periods of the hour being measured have passed. Thus if the digit 5 upon wheel 3 is presented to view it indicates that five ten minute periods or fifty minutes of the hour being measured have passed. At the final step of the hour measuring half revolution of the wheel 3 a 0 is presented to view to indicate that six ten minute periods (or one hour) have passed. The digit 1 in the next half circle of the wheel is next to be displayed and is displayed when the first ten minute period of the next hour has passed.

The character wheel 4 remains idle during the time the wheel 3 is indicating the passage of the first five ten minute periods of an hour but is moved when the sixth ten minute period has been measured in order that the wheel 4 may present the next digit before the corresponding display opening to indicate the number of hours of a half day that have passed. The wheel 4 is designed to make one complete revolution during a half day and therefore the periphery of this wheel is divided into twelve spaces numbered successively 1 to 12. In Fig. 1 the time noted is one o'clock a. m. or p. m. By way of further example, reading from the left to the right, if the figures 2, 5, 8, 9, appear before the four display openings the time noted would be fifty-eight minutes fifty-four seconds past two a. m. or p. m.

By means of my invention I am enabled to effect the movement of the character wheels at the predetermined intervals without the aid of a counter shaft and attendant gearing, each of the four character wheels preferably having self-acting character wheel moving mechanism whose operation is deferred by arresting or withholding mechanism which is withdrawn at the appointed times to permit the self-acting mechanism to perform its function. Thus, by means, whose preferred form is later to be specifically set forth, the wheel 1 is permitted to operate one step or a tenth of a revolution each time six seconds have passed, the mechanism that operates the wheel 1 removing the restraint from the self-acting mechanism pertaining to wheel 2 when the wheel 1 has completed the ten steps of its revolution, then to permit the wheel 2 to move one-tenth of a revolution to denote the passage of an individual minute. In like manner the self-acting mechanism that operates the wheel 2 removes the restraint from the self-acting mechanism pertaining to wheel 3 when the wheel 2 has completed the ten steps of its revolution, then to permit the wheel 3 to move one-twelfth of a revolution (that is through one-sixth of its hour measuring cycle) to denote the passage of a ten minute period. Thus also the self-acting mechanism that operates the wheel 3 removes the restraint from the self-acting mechanism pertaining to wheel 4 when the wheel 3 has completed the six steps of its hour measuring half revolution, then to permit the wheel 4 to move one-twelfth of a revolution to denote the passage of an individual hour. Each self-acting character wheel operating mechanism pertaining to the wheels 1, 2 and 3, in addition to removing the restraint from the self-acting mechanism immediately succeeding the same, also desirably accumulates power for operating such succeeding self-acting mechanism.

Gravity desirably serves to operate the character wheels, the weights 6, 7, 8 and 9 being individual to and forming parts of self-acting mechanism that respectively pertain to the wheels 1, 2, 3 and 4. The weight 6 is shown as including an armature 10 of an electro-magnet whose energizing coil 11 is, in the embodiment of the invention under consideration, included in circuit once each six seconds then to elevate the weight, this circuit being broken immediately upon the elevation of the weight in order to permit the weight to perform its function.

The operating mechanism for the character wheel 1 includes the weight 6 which has a horizontal axis of rotation and is provided with an arm 12 upon the outer end of which there is mounted a forwardly projecting pin 13 that has a base 14 in the form of a truncated cone and which base constitutes a cam for the purpose of properly imparting the final movement to the character wheel 1 during the latter part of the descent of the weight 6. The self-acting mechanism pertaining to the wheel 1 also includes an actuating pawl 15 pivoted upon a pawl carrier 16 adapted for engagement with the teeth of the ten toothed wheel or turning element 17 that is in fixed relation with the wheel 1 and, together therewith, is loosely mounted upon the shaft 18 anchored at its ends to the side walls of the casing 5 (and upon which shaft the other character wheels and the toothed wheels pertaining thereto are also loosely mounted). The lower end of the pawl carrier 16 carries a roller 19 that turns upon the pin 13 and the cam 14 as this end of the carrier is moved upwardly by the descending weight 6. During the periods of inaction of the wheel 1 the wheel 17 is prevented from turning in one direction by the trailing dog 20 and in the reverse direction by the holding dog 21, which holding dog is constituted of a shoulder formed in the pawl carrier 16. Each time the weight 6 is elevated in response to the energization of the magnet 11, the pawl carrier 16 is permitted to drop to disengage the holding dog 21 from the wheel 17 and to bring the pawl 15 before a fresh tooth so that when the pawl carrier 16 is elevated upon the descent of the weight 6 the wheel 17 may be turned one-tenth of a revolution to carry with it the wheel 1 to indicate the passage of six seconds of time, and when this movement has been completed the holding dog is positioned to coöperate with the trailing dog 20 to prevent the wheel 17 from operating. In order that the character wheels may be adjusted to synchronism with correct time the pawl 16 has a handle 22 to enable it to be operated independently of the magnet.

The self-acting mechanism for moving the wheel 2 comes into play to indicate the passage of an individual minute as the wheel 1 completes a revolution. This self-acting mechanism includes the U-shaped lever 23 that carries the weight 7, which lever is free to turn upon a shaft 24 anchored at its ends in the side walls of the casing 5. The upper and left hand end of this U-shaped lever carries an actuating pawl 25 adapted for successive engagement with the teeth upon the ten toothed wheel or turning element 26, this wheel being in fixed relation with the wheel 2. When this lever is free to operate, the weight 7 will press it forwardly to move the actuating pawl 25 forwardly and thereby turn the wheel 26 one-tenth of a revolution to effect corresponding movement of the character wheel 2 to denote the passage of a minute of time. In order that the weight 7 may function it is elevated indirectly by the weight 6 and directly by the cam 27 moving with the wheels 1 and 17. The periphery of this cam engages a pin 28 carried by the left hand branch of the lever 23 whereby the lever is gradually moved to the rear, in opposition to the weight 7, in ten stages of operation, the cam drop 29 being brought into register with this pin when the character wheel 1 presents its 0 before its display opening in the casing 5 whereupon the weight 7 is released to permit it to effect the forward movement of the lever. Before the forwardly moving actuating pawl 25 may function the holding dog or pawl 30 (whose nose normally substantially fills the gap between adjacent teeth of the wheel 26) is removed from engagement with this wheel 26, a result which is effected before the pawl 25 is brought into actuating engagement with said wheel. To this end the holding dog or pawl 30 carries a pin 31 upon its nose, this pin normally overlying the forward end of the dog releasing trip lever 32 which is pivotally mounted upon the forwardly extending arm 33 carried upon the lever 23, the heavier tail end of the trip lever normally resting upon a lug 34 also carried by the lever 23. When the lever 23 is moved to the rear the trip lever 32 will move therewith but, being very light, will be depressed at its forward end by its engagement with the pin 31 so as to escape the same. When the weight 7 is released consequent upon the registry of the pin 28 with the cam drop 29, the blunt forward end of the trip lever 32 will abut against the adjacent side of the pin 31 and, as the lever 23 continues its forward movement, will raise the holding dog 30 from engagement with the wheel 26 to free this wheel and permit it to be moved by the pawl 25 during continued forward movement of the lever 23, the engagement between the pawl 25 and the tooth of the wheel 26 facing the same being effected immediately after the holding dog 30 has been removed from engagement with the wheel. The range of forward movement of the lever 23, following the release of the dog 30 from the wheel 26 and the operating engagement of the pawl 25 with this wheel is such as to cause the wheel to move one-tenth of a revolution, the wheel 2 moving with the wheel 26 to present a new character before its display opening in the casing 5, at which time the broad nose of the holding dog 30 falls into a new space to prevent the rotation of the wheel 26 in either direction. It will be seen that it requires ten revolutions of the connected wheels 1 and 17 to cause a single revolution of the wheel 2 during each of which ten revolutions of the wheels 1 and 17 power is gradually accumulated in the power storage device 7 to operate the wheel 2 and while I prefer to use a power storage device in which power is accumulated consequent upon the operation of the preceding character wheel I do not wish to be limited to this method of supplying actuating influence to character wheels.

The self-acting mechanism for moving the wheel 3 comes into play to indicate the passage of a ten minute period as the wheel 2 completes a revolution. This self-acting mechanism includes the U-shaped lever 35 that carries the weight 8, which lever is free to turn upon the shaft 24. The upper end of the left hand branch of this U-shaped lever 35 carries an actuating pawl 36 adapted for successive engagement with the teeth upon the twelve toothed wheel or turning element 37, this wheel being in fixed relation with the wheel 3. When this lever is free to operate the weight 8 will press it forwardly to move the pawl 36 forwardly and thereby turn the wheel 37 one-twelfth of a revolution to effect corresponding movement of the character wheel 3 to denote the passage of a ten minute period. In order that the weight 8 may function it is elevated indirectly by the weight 7 and directly by the cam 38 moving with the wheels 2 and 26. The periphery of this cam engages a pin 39 carried by the upper end of the right hand branch of the lever 35 whereby the lever is gradually moved to the rear, in opposition to the weight 8, in ten stages of operation, the cam drop 40 being brought into register with this pin when the character wheel 2 presents its 0 before its display opening in the casing 5 whereupon the weight 8 is released to permit it to effect the forward movement of the lever. Before the forwardly moving actuating pawl 36 may function the holding dog or pawl 41 (whose nose normally substantially fills the gap between adjacent teeth of the wheel 37) is removed from engagement with this wheel, a result which is effected before the pawl 36 is brought into actuating engagement with said wheel. To this end the holding dog or pawl 41 carries a pin 42 upon its nose, this pin normally overlying the forward end of a dog releasing trip lever 43 which is pivotally mounted upon the forwardly extending arm 44 carried upon the lever 35, the heavier tail end of the trip lever normally resting upon a lug 45 also carried by the lever 35. When the lever 35 is moved to the rear the trip lever 43 will move therewith but, being very light, will be depressed at its forward end by its engagement with the pin 42 so as to escape the same. When the weight 8 is released consequent upon the registry of the pin 39 with the cam drop 40, the blunt forward end of the trip lever 43 will abut against the adjacent side of the pin 42 and, as the lever 35 continues its forward movement, will raise the holding dog 41 from engagement with the wheel 37 to free this wheel and permit it to be moved by the pawl 36 during continued forward movement of the lever 35, the engagement between the pawl 36 and the tooth of the wheel 37 facing the same being effected immediately after the holding dog 41 has been removed from engagement with the wheel. The range of forward movement of the lever 35, following the release of the dog 41 from the wheel 37 and the operating engagement of the pawl 36 with this wheel is such as to cause the wheel to move one-twelfth of a revolution or one-sixth of the hour measuring cycle of movement of the wheel 3 which is one-half a revolution of this wheel, the wheel 3 moving with the wheel 37 to present a new character before its display opening in the casing 5 at which time the broad nose of the holding dog 41 falls into a new tooth space to prevent the rotation of the wheel 37 in either direction. It will be seen that it requires 6 revolutions of the connected wheels 2 and 26 to cause a half (hour measuring) revolution of the wheel 3, during each of which six revolutions of the wheels 3 and 37 power is gradually accumulated in the power storage device 8 to operate the wheel 3.

The self-acting mechanism for moving the wheel 4 comes into play to indicate by each of the step by step movements of the wheel the passage of an hour, each such movement of the wheel 4 occurring each time the wheel 3 completes a half revolution. This self-acting mechanism includes a U-shaped lever 46 that carries the weight 9, which lever is free to turn upon the shaft 24. The upper end of the left hand branch of this U-shaped lever 46 carries an actuating pawl 47 adapted for successive engagement with the teeth upon the twelve toothed wheel or turning element 48, this wheel being in fixed relation with the wheel 4. When this lever is free to operate the weight 9 will press it forwardly to move the actuating pawl 47 forwardly and thereby turn the wheel 48 one-twelfth of a revolution to effect the corresponding movement of the character wheel 4 to denote the passage of an hour. In order that the weight 9 may function it is elevated indirectly by the weight 8 and directly by the cam 49 moving with the wheels 3 and 37. The periphery of this cam engages a pin 50 carried by the upper end of the right hand branch of the lever 46 whereby the lever is gradually moved to the rear, in opposition to the weight 9, in six stages of operation, one or the other of the diametrically opposite cam drops 51 being brought into register with this pin when the character wheel 3 presents one or the other of its zeros, which are diametrically opposite, before its display opening in the casing 5, whereupon the weight 9 is released to permit it to effect the forward movement of the lever, which forward movement thus occurs twice during each complete revolution of the character wheel 3 and the toothed wheel 37 moving therewith. Before the forwardly moving actuating pawl 47 may function the holding dog or pawl 52 (whose nose normally substantially fills the gap between adjacent teeth of the wheel 48) is removed from engagement with this wheel, a result which is effected before the pawl 47 is brought into actuating engagement with said wheel. To this end the holding dog or pawl 52 carries a pin 53 upon its nose, this pin normally overlying the forward end of a dog releasing trip lever 54 which is pivotally mounted upon the forwardly extending arm 55 carried upon the lever 46, the heavier tail end of the trip lever normally resting upon a lug 56 also carried by the lever 46. When the lever 46 is moved to the rear the trip lever 54 will move therewith but, being very light, will be depressed at its forward end by its engagement with the pin 53 so as to escape the same. When the weight 9 is released consequent upon the registry of the pin 50 with one of the cam drops 51, the blunt forward end of the trip lever 54 will abutt against the adjacent side of the pin 53 and, as the lever 46 continues its forward movement, will raise the holding dog 52 from engagement with the wheel 48 to free this wheel to permit it to be moved by the pawl 47 during continued forward movement of the lever 46, the engagement between the pawl 47 and the tooth of the wheel 48 facing the same being effected immediately after the holding dog 52 has been removed from engagement with the wheel. The range of forward movement of the lever 46 following the release of the dog 52 from the wheel 48 and the operating engagement of the pawl 47 with this wheel is such as to cause the wheel to move one-twelfth of a revolution, the wheel 4 moving with the wheel 48 to present a new character before its display opening in the casing 5, at which time the broad nose of the holding dog 52 falls into a new space to prevent the rotation of the wheel 48 in either direction. It will be seen that it requires six revolutions of the connected wheels 3 and 37 to cause a complete revolution of the wheel 4, during each half of which six revolutions of the wheels 3 and 37 power is gradually accumulated in the power storage device 9 to operate the wheel 4.

The character wheels are positioned to indicate that the hour of one o'clock has just been reached, the actuating pawls individual to the various toothed wheels being illustrated in their foremost positions with the holding dogs entering untoothed spaces between adjacent teeth. The oscillating U-shaped weighted levers and the weight actuated lever 16 together with the actuating pawls mounted thereupon remain in these positions during predetermined intervals of time. The pawl 15 and dogs 20 and 21 remain in their positions, shown clearly in Fig. 10, until the weight 6 is again operated, this time period being six seconds minus the small fraction of a second required in the movement of these parts during the elevation and release of the weight 6. The pawl 25 remains in its illustrated position a similar period of time and remains at each rearward step it takes consequent upon each of the ten step by step movements of the wheel 17 a similar period. The associate holding dog 30 remains in its illustrated position a minute, minus the necessary time taken for its movement and adjustment. The actuating pawl 36 remains in its illustrated position and at each rearward step it takes one minute minus the time necessary for its movements, while the associate holding dog 41 remains in its illustrated position a ten minute period minus the time necessary for its movement. The actuating pawl 47 remains in its illustrated position and at each rearward step it takes ten minutes minus the time necessary for its movements, while the associate holding dog 52 remains in its illustrated position one hour minus the time necessary for its movement. The character wheels remain in the positions to which they are stepped periods of time equal to the respective periods during which the dogs to which they are individual are in withholding or arresting engagement with the toothed wheels contiguous thereto. This result is assured owing to the presence of untoothed spaces between the teeth of the toothed wheels and the employment of holding dogs with noses that completely fill these spaces to prevent movement of the toothed wheels in either direction.

While I have herein shown and particularly described one embodiment of my invention and a specific purpose to which it may be applied, I do not wish to be limited to the precise details of construction shown nor to any particular use to which the invention may be put since the construction and adaptation of the mechanism may be varied without departing from the spirit of my invention.

Having thus described my invention I claim as new and desire to secure by Letters Patent the following:

1. A motion transmitting mechanism including a plurality of turning elements; means for turning one of these elements first; a swinging power storing lever for turning the next turning element, which latter element is in the form of a toothed wheel; a holding dog for engaging the toothed wheel; a wheel tooth engaging actuating pawl carried by the lever and in lost motion relation to the wheel; a releasing element operated by the lever and in escaping relation to the holding dog when the lever is turned in one direction to store power and in lifting engagement with said dog when the lever movement is reversed; and a cam operated by the first operated turning element for swinging the lever to store lever operating power and which cam is adapted for escaping connection with the lever and is brought to position to escape the lever when the first operated turning element has operated.

2. A motion transmitting mechanism including a plurality of turning elements; means for turning one of these elements first; a swinging power storing lever for turning the next turning element, which latter element is in the form of a toothed wheel, the lever being provided with means whereby it may be turned by the first operated turning element to raise its weight and may thereafter escape its connection with this element to permit the lever to be operated by stored power; a holding dog for engaging the toothed wheel; a wheel tooth engaging actuating pawl carried by the lever and in lost motion relation to the wheel; and a releasing element operated by the lever and in escaping relation to the holding dog when the lever is turned in one direction to store power and in lifting engagement with said dog when the lever movement is reversed.

3. A motion transmitting mechanism including a plurality of turning elements; means for turning one of these elements first; a swinging power storing lever for turning the next turning element, which latter element is in the form of a toothed wheel, the lever being provided with means whereby it may be turned by the first operated turning element to raise its weight and may thereafter escape its connection with this element to permit the lever to be operated by stored power; a holding dog for engaging the toothed wheel; a wheel tooth engaging actuating pawl carried by the lever; and a releasing element operated by the lever and in escaping relation to the holding dog when the lever is turned in one direction to store power and in lifting engagement with said dog when the lever movement is reversed.

4. A motion transmitting mechanism including a plurality of turning elements; means for turning one of these elements first; an oscillating lever for turning the next turning element, which latter element is in the form of a toothed wheel, the lever being provided with means whereby it may be turned by the first operated turning element to prepare the lever for operation and may thereafter escape its connection with this element to permit the operation of the lever; a holding dog for engaging the toothed wheel; a wheel tooth engaging actuating pawl operated by the lever; and a releasing element operated by the lever and in escaping relation to the holding dog when the lever is turned preparatory to moving the wheel and which element is in lifting engagement with said dog when the lever movement is reversed.

In witness whereof, I hereunto subscribe my name this third day of December, A. D. 1914.

SAMUEL P. THRASHER.

Witnesses:
MIRIAM T. CRAGG,
G. L. CRAGG.

Copies of this patent may be obtained for five cents each, by addressing the "Commissioner of Patents, Washington, D. C."